United States Patent
Oshima

(10) Patent No.: US 11,574,294 B2
(45) Date of Patent: Feb. 7, 2023

(54) INFORMATION PROCESSING METHOD, INFORMATION PROCESSING DEVICE, AND RECORDING MEDIUM

(71) Applicant: NEC Corporation, Tokyo (JP)

(72) Inventor: Akiko Oshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/962,289

(22) PCT Filed: Jan. 23, 2019

(86) PCT No.: PCT/JP2019/001998
§ 371 (c)(1),
(2) Date: Jul. 15, 2020

(87) PCT Pub. No.: WO2019/151068
PCT Pub. Date: Aug. 8, 2019

(65) Prior Publication Data
US 2021/0065152 A1    Mar. 4, 2021

(30) Foreign Application Priority Data
Jan. 31, 2018    (JP) .............................. JP2018-015408

(51) Int. Cl.
| | |
|---|---|
| *G06Q 20/20* | (2012.01) |
| *H04W 4/80* | (2018.01) |
| *G06Q 10/08* | (2012.01) |
| *G06Q 30/06* | (2012.01) |
| *G06V 20/13* | (2022.01) |

(52) U.S. Cl.
CPC ......... *G06Q 20/203* (2013.01); *G06Q 10/087* (2013.01); *G06Q 30/0633* (2013.01); *G06V 20/13* (2022.01); *H04W 4/80* (2018.02)

(58) Field of Classification Search
None
See application file for complete search history.

(56) References Cited

U.S. PATENT DOCUMENTS

| | | | | |
|---|---|---|---|---|
| 6,700,310 | B2 * | 3/2004 | Maue ..................... | B60R 25/24 310/319 |
| 6,725,206 | B1 * | 4/2004 | Coveley ................. | G01G 19/12 705/414 |
| 10,140,820 | B1 * | 11/2018 | Zalewski ............. | G07G 1/0072 |

(Continued)

FOREIGN PATENT DOCUMENTS

| | | |
|---|---|---|
| EP | 3422309 A1 | 1/2019 |
| JP | 2004-171241 A | 6/2004 |

(Continued)

OTHER PUBLICATIONS

PCT/ISA/210 International Search Report corresponding to PCT/JP2019/001998, dated Mar. 19, 2019, 1 page.

(Continued)

*Primary Examiner* — Fateh M Obaid

(57) ABSTRACT

An information processing method according to an aspect of the present disclosure includes: acquiring, from a video, flow line information of a customer; detecting that the customer acquires an item; and storing, in a storage, flow line information of the customer and information on a number of items acquired by the customer, in association with each other.

7 Claims, 6 Drawing Sheets

(56) References Cited

U.S. PATENT DOCUMENTS

| | | | |
|---|---|---|---|
| 10,885,642 B1* | 1/2021 | Krishnamurthy | G06Q 20/32 |
| 11,023,728 B1* | 6/2021 | Wang | G06N 20/00 |
| 11,023,740 B2* | 6/2021 | Mirza | G06K 9/00718 |
| 11,176,598 B2* | 11/2021 | D'Souza | G06N 3/0445 |
| 11,176,686 B2* | 11/2021 | Mirza | G06N 3/0454 |
| 11,188,763 B2* | 11/2021 | Krishnamurthy | G06T 7/223 |
| 2003/0002712 A1* | 1/2003 | Steenburgh | G06K 9/00778 |
| | | | 382/103 |
| 2007/0219866 A1* | 9/2007 | Wolf | G06Q 30/00 |
| | | | 705/14.43 |
| 2011/0125551 A1* | 5/2011 | Reiser | G06Q 30/0202 |
| | | | 705/7.31 |
| 2015/0066550 A1* | 3/2015 | Harada | G06Q 10/063 |
| | | | 705/7.11 |

FOREIGN PATENT DOCUMENTS

| | | |
|---|---|---|
| JP | 2007-079615 A | 3/2007 |
| JP | 2011-170562 A | 9/2011 |
| JP | 2015-001879 A | 1/2015 |
| JP | 2017-157216 A | 9/2017 |
| WO | 2013/145632 A1 | 10/2013 |
| WO | WO-2015/140853 A1 | 9/2015 |

OTHER PUBLICATIONS

PCT/ISA/237 written opinion corresponding to PCT/JP2019/001998 dated Mar. 19, 2019, 6 pages.

JP Office Action for JP Application No. 2018-015408, dated Aug. 2, 2022 with English Translation.

* cited by examiner

Fig.2

| FLOW LINE ID | TIME-SERIES POSITIONAL INFORMATION (TIME/COORDINATE) | NUMBER OF ACQUIRED ITEMS (PIECES) |
|---|---|---|
| 1 | (12:35:00／2.0,1.5;4.0)、<br>(12:35:15／2.5,1.0;4.0)、・・・ | 1 |
| 2 | (12:35:00／3.5,9.5;4.0)、<br>(12:35:15／3.5,8.5;4.0)、・・・ | 2 |
| 3 | (12:35:00／10.0,5.5;4.0)、<br>(12:35:15／10.0,5.5;4.0)、・・・ | 0 |
| ・・・ | ・・・ | ・・・ |

INFORMATION PROCESSING METHOD, INFORMATION PROCESSING DEVICE, AND RECORDING MEDIUM

CROSS-REFERENCE TO RELATED APPLICATIONS

This application is a national stage application of International Application No. PCT/JP2019/001998 entitled "INFORMATION PROCESSING METHOD, INFORMATION PROCESSING DEVICE, AND RECORDING MEDIUM," filed on Jan. 23, 2019, which claims the benefit of the priority of Japanese Patent Application No. JP2018-015408 filed on Jan. 31, 2018, the disclosures of each of which are hereby incorporated by reference in their entirety.

TECHNICAL FIELD

The present disclosure relates to an information processing method, an information processing device, and a recording medium, and relates to a technique for processing data of a video.

BACKGROUND ART

In a mass retailer such as a convenience store or a supermarket, a monitoring camera for capturing inside of a store is installed. In general, a shop clerk or a security guard finds a crime and fraud such as shoplifting by monitoring a video on a monitor. However, there is another method for preventing shoplifting.

For example, in PTL 1, a method in which a radio frequency identification (RFID) tag is attached to an item is disclosed. However, the method described in PTL 1 has a problem that a cost increases, since it is required to attach a RFID tag to all items. Also, it is not possible to acquire information as to which customer acquires an item.

Further, there is a method of monitoring a customer by using a flow line analysis technique (for example, PTL 2) for tracking the customer on a video. In PTL 3, information on the number of items acquired by a customer and an image being captured for the customer are managed in association with each other. When a customer pays for an acquired item, the number of items registered in a point of sales (POS) terminal and the number of items acquired by the customer are compared with each other. When those numbers of items do not match, it is determined that there is a possibility of a fraud.

The method disclosed in PTL 3 has an advantageous effect that a shop clerk or a security guard does not need to continuously monitor a video.

CITATION LIST

Patent Literature

[PTL 1] Japanese Unexamined Patent Application Publication No. 2007-079615

[PTL 2] Japanese Unexamined Patent Application Publication No. 2011-170562

[PTL 3] Japanese Unexamined Patent Application Publication No. 2004-171241

[PTL 4] International Publication No. WO2015/140853

SUMMARY OF INVENTION

Technical Problem

However, the method disclosed in PTL 3 has a problem related to privacy, since an image being captured for a customer is managed without permission from the customer.

An object of the present disclosure is to precisely determine an acquisition state of an item for each customer while considering privacy of a customer, without identifying an individual.

Solution to Problem

An information processing method according to one aspect of the present disclosure includes: acquiring, from a video, flow line information of a customer; detecting that the customer acquires an item; and storing, in a storage, the flow line information of the customer and information on the number of items acquired by the customer, in association with each other.

An information processing device according to one aspect of the present disclosure includes: at least one memory configured to store instructions; and at least one processor configured to execute the instructions to: acquire, from a video, flow line information of a customer; detect that the customer acquires an item; and store, in a storage, the flow line information of the customer and information on the number of items acquired by the customer, in association with each other.

A non-transitory recording medium according to one aspect of the present disclosure stores a program for causing a computer to execute: acquiring, from a video, flow line information of a customer; detecting that the customer acquires an item; and storing, in a storage, the flow line information of the customer and information on the number of items acquired by the customer, in association with each other.

Advantageous Effects of Invention

According to one aspect of the present disclosure, an acquisition state of an item for each customer is able to be precisely determined without identifying an individual.

BRIEF DESCRIPTION OF DRAWINGS

FIG. 2 is a diagram illustrating one example of a data base (DB) of flow line—acquisition number information stored in a storage unit of the in-store monitoring device according to the example embodiment 1.

EXAMPLE EMBODIMENT

Example Embodiment 1

A configuration and an operation of an in-store monitoring device according to the present example embodiment is described with reference to FIGS. 1 to 4.

(Configuration of In-Store Monitoring Device 1)

Figure 1:
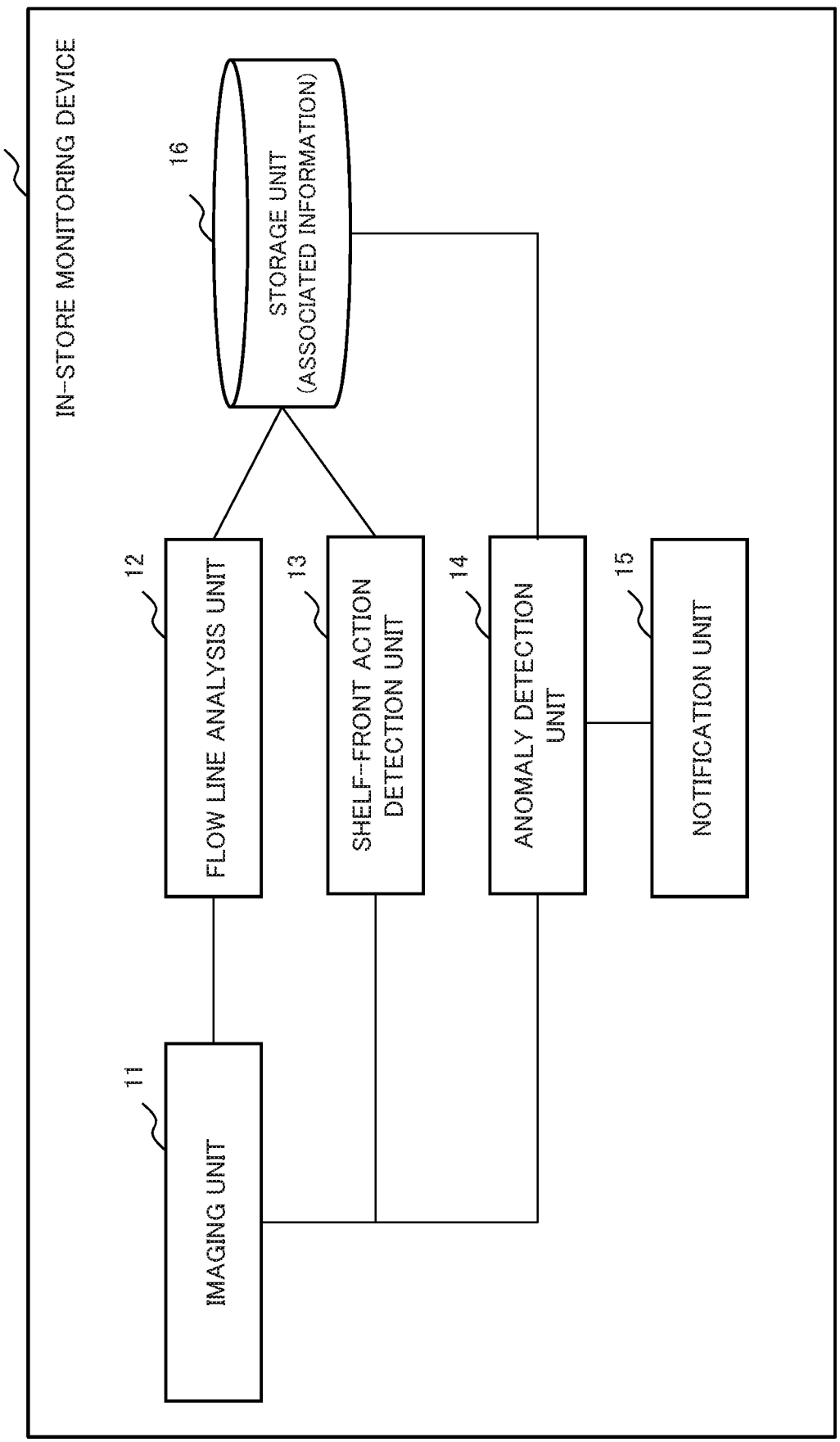
FIG. 1 is a block diagram illustrating a configuration of an in-store monitoring device according to an example embodiment 1.

FIG. 1 is a block diagram illustrating a configuration of an in-store monitoring device 1 according to the present example embodiment. As illustrated in FIG. 1, the in-store monitoring device 1 includes an imaging unit 11, a flow line analysis unit 12, a shelf-front action detection unit 13, an anomaly detection unit 14, a notification unit 15, and a storage unit 16.

The imaging unit 11 captures inside of a store, and generates data of a video (moving image). The imaging unit 11 may include one camera or a plurality of cameras for capturing a video. The imaging unit 11 transmits the data (pixel data forming a video frame) of the video acquired by capturing the inside of the store to the flow line analysis unit 12, the shelf-front action detection unit 13, and the anomaly detection unit 14. The storage unit 16 stores flow line—acquisition number information.

The flow line—acquisition number information is information in which flow line information of a customer and information on the number of items acquired by the customer are associated with each other. Note that, the number of items acquired by the customer is, herein, the number of items that the customer picks up from a shelf and possesses.

FIG. 2 is a diagram illustrating one example of a data base (DB) of flow line—acquisition number information stored in the storage unit 16. As illustrated in FIG. 2, in the DB of the flow line—acquisition number information, for example, an ID (flow line ID) for identifying a flow line of a customer, time-series positional information (time/coordinate) of the customer, and the number of items acquired by the customer may be associated with each other. Note that, in FIG. 2, a time-series position of a customer is represented by 3D view coordinates viewed from the camera of the imaging unit 11. Note that, the flow line—acquisition number information is not limited to the DB illustrated in FIG. 2.

The flow line information includes information on a positional change of a moving object (herein, a customer) over time. A flow line is a trajectory drawn by movement of a moving object.

An operation of the flow line analysis unit 12, the shelf-front action detection unit 13, the anomaly detection unit 14, and the notification unit 15 will be described later.

Note that, the in-store monitoring device 1 may not include the imaging unit 11 and the storage unit 16. In this case, the in-store monitoring device 1 acquires data of a video captured by an imaging device (for example, a camera). Further, the in-store monitoring device 1 stores the flow line—acquisition number information in a storage device (for example, a memory).

(First Anomaly Detection Processing)

Figure 3:
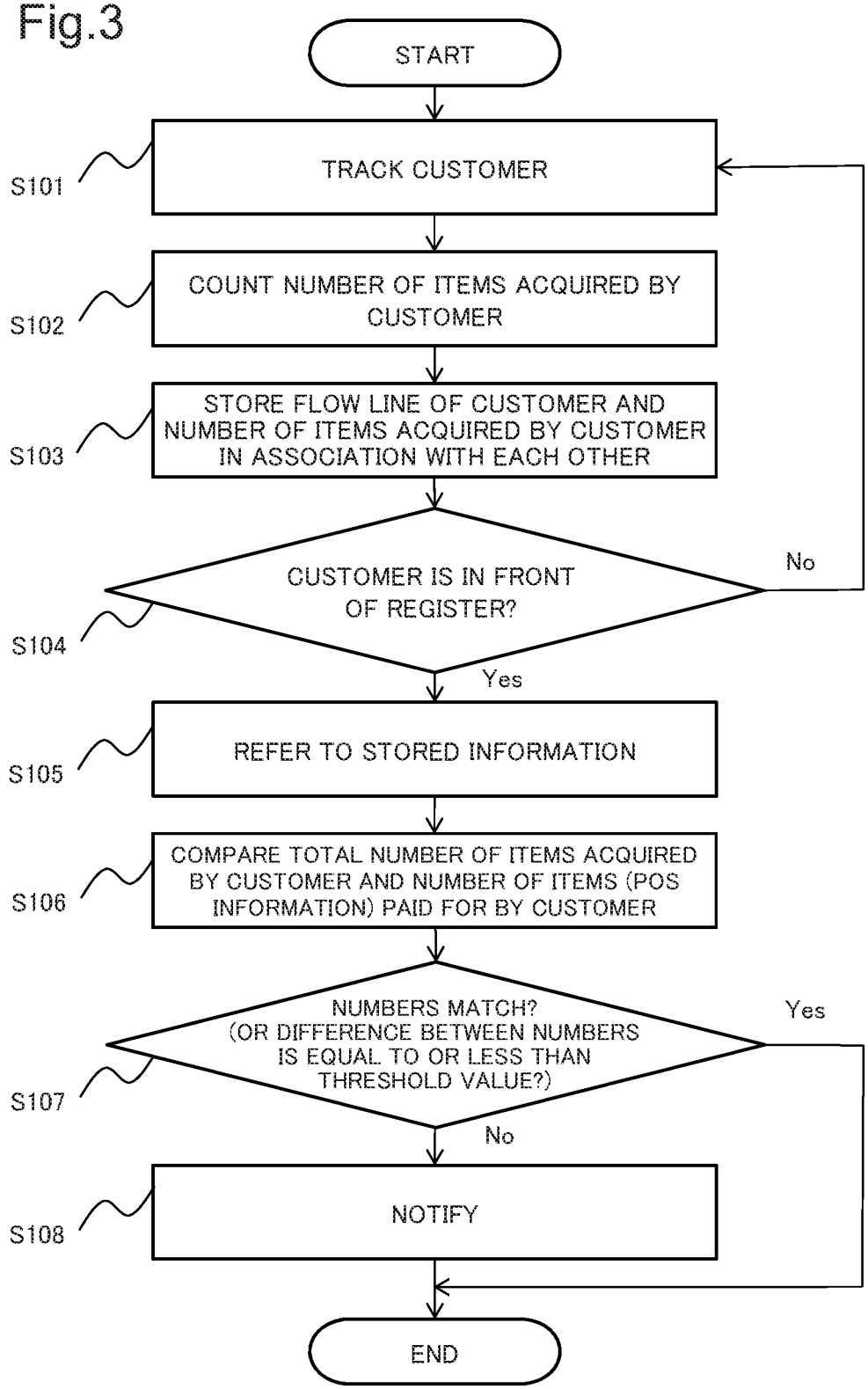
FIG. 3 is a flowchart illustrating a first example of an operation of the in-store monitoring device according to the example embodiment 1.

As one example of anomaly detection processing executed by the in-store monitoring device 1, a flow of first anomaly detection processing is described with reference to FIG. 3. FIG. 3 is a flowchart illustrating the flow of the first anomaly detection processing.

As illustrated in FIG. 3, in the first anomaly detection processing, the flow line analysis unit 12 tracks a customer by using data of a video received from the imaging unit 11 (S101). More specifically, the flow line analysis unit 12 generates and outputs flow line information of the customer by detecting the customer from each frame forming the video at a certain time interval, and analyzing positional change of the detected customer over time. A technique for tracking a moving object is, for example, disclosed in PTL 2. In the present example embodiment, detailed description on a technique for tracking a customer is omitted.

The shelf-front action detection unit 13 detects an action by the customer taken on a shelf (gondola) and measures the number of items acquired by the customer from the shelf by analyzing the data of the video received from the imaging unit 11 (S102). A technique for detecting an action (shelf-front action) in which a customer acquires an item from a shelf or returns an item to a shelf is, for example, disclosed in PTL 3. In the present example embodiment, detailed description on the technique for detecting a shelf-front action is omitted.

The shelf-front action detection unit 13 stores, as flow line—acquisition number information in the storage unit 16, the flow line information of the customer generated by the flow line analysis unit 12 and information on the number of items acquired by the customer from the shelf in association with each other (S103).

The anomaly detection unit 14 detects that the customer enters a register-front area. The register-front area is an area where a customer lines up to pay for an acquired item at a register. A location and a shape of an area where a customer waiting for payment lines up is different depending on a structure and the like of a store. Therefore, a register-front area for the anomaly detection unit 14 to detect a person may be set for each store.

When detecting that the customer moves into the register-front area (Yes in S104), the anomaly detection unit 14 identifies a flow line relates to a customer at a head of a line among customers in the register-front area, by referring to the flow line—acquisition number information stored in the storage unit 16, and acquires information on the number of items acquired by the customer at the head of the line (S105). In the following, the customer at the head of the line among customers in the register-front area is referred to as a determination target.

Further, the anomaly detection unit 14 also acquires information on the number of items registered in a POS terminal after the determination target moves into the register-front area. Then, the anomaly detection unit 14 compares the number of items registered in the POS terminal with the number of items acquired by the determination target (S106).

In the first anomaly detection processing, the anomaly detection unit 14 detects, as an anomaly, that the number of items acquired by the determination target and the number of items registered in the POS terminal do not match. When the number of items acquired by the determination target and the number of items registered in the POS terminal do not match (No in S107), the anomaly detection unit 14 causes the notification unit 15 to notify the anomaly (S108). The notification unit 15 may transmit an anomaly signal (alert) to, for example, a portable terminal possessed by a security guard or a terminal in an office.

In one modification example, anomaly detection unit 14 may cause the notification unit 15 to notify an anomaly when a difference between the number of items acquired by the determination target and the number of items registered in the POS terminal exceeds a certain number (threshold value) larger than one.

(Second Anomaly Detection Processing)

Figure 4:
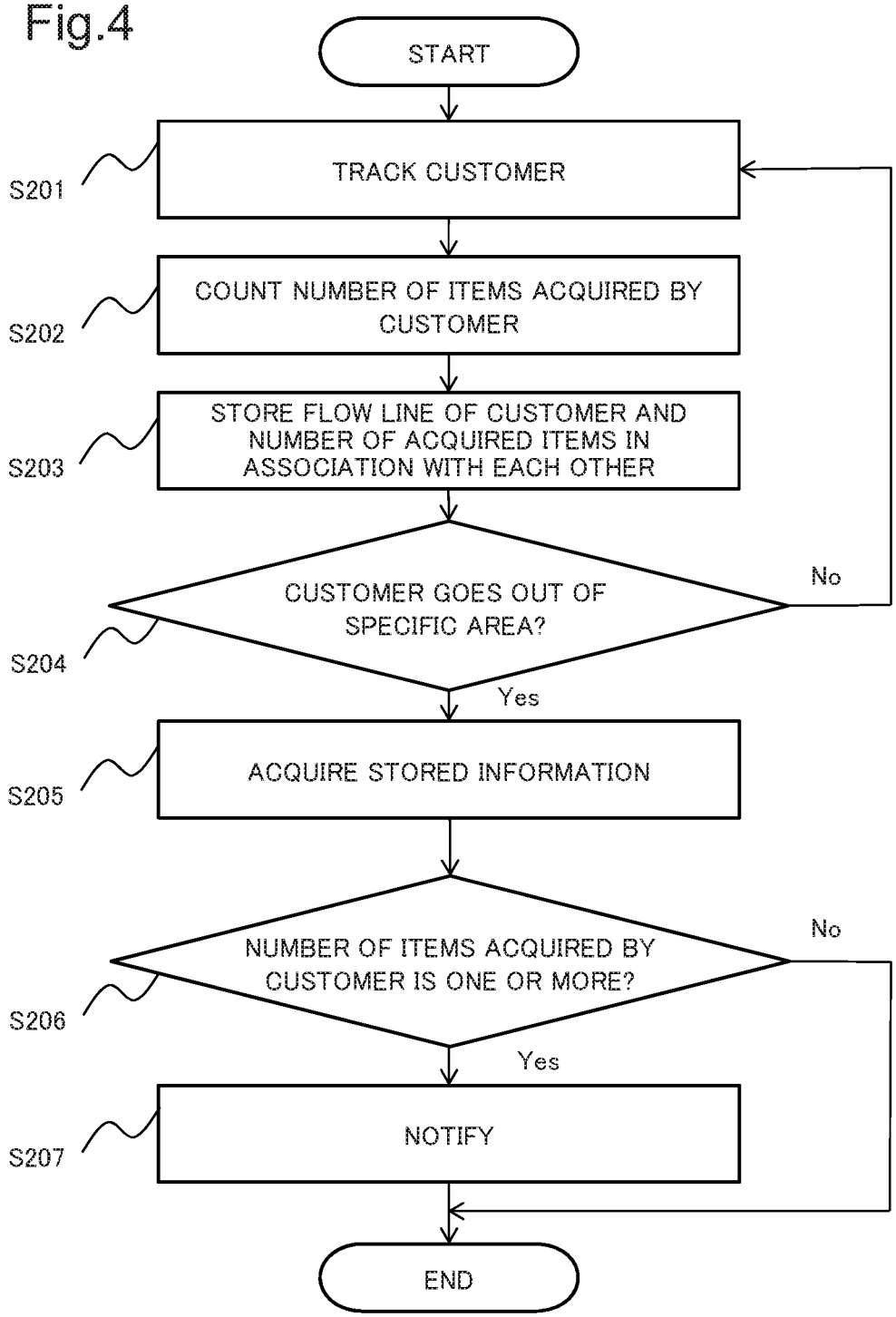
FIG. 4 is a flowchart illustrating a second example of the operation of the in-store monitoring device according to the example embodiment 1.

As another example of the anomaly detection processing executed by the in-store monitoring device 1, a flow of second anomaly detection processing is described with reference to FIG. 4. FIG. 4 is a flowchart illustrating the flow of the second anomaly detection processing.

As illustrated in FIG. 4, in the second anomaly detection processing, the flow line analysis unit 12 tracks a customer, based on a video received from the imaging unit 11 (S201).

The shelf-front action detection unit 13 detects, from a video received from the imaging unit 11, an action by a customer taken on a shelf (gondola) and measures the number of items acquired by the customer from the shelf (S202).

The flow line analysis unit 12 and the shelf-front action detection unit 13 store, as flow line—acquisition number information in the storage unit 16, flow line information of the customer and information on the number of items acquired by the customer from the shelf in association with each other (S203). S201 to S203 of the second anomaly detection processing is identical to S101 to S103 of the first anomaly detection processing.

The anomaly detection unit 14 detects that the customer goes out of a specific area. The specific area is, for example, area where a shelf for displaying an item is arranged, a register-front area, and another area where a customer is allowed to possess an unpaid item. The anomaly detection unit 14 may detect that the customer crosses a specific line, instead of detecting that the customer goes out of the specific area. The specific line is a border between an area where a customer is allowed to possess an unpaid item and an area where a customer is not allowed to possess an unpaid item.

When detecting that the customer goes out of the specific area (Yes in S204), the anomaly detection unit 14 identifies a flow line related to the customer who goes out of the specific area, by referring to the flow line—acquisition number information stored in the storage unit 16, and acquires, from the storage unit 16, the information on the number of items acquired by the customer (S205).

In the second anomaly detection processing, the anomaly detection unit 14 determines, as an anomaly, that the customer goes out of the specific area while acquiring an unpaid item. When the customer goes out of the specific area while acquiring an unpaid item (Yes in S206), the anomaly detection unit 14 causes the notification unit 15 to notify the anomaly (S207). A notification method is not particularly limited. The notification unit 15 may transmit an anomaly signal (alert) to, for example, a portable terminal possessed by a security guard or a terminal in an office.

MODIFICATION EXAMPLE

The in-store monitoring device 1 according to one modification example may not perform flow line analysis and shelf-front action detection of a customer, and an external device (for example, a network server) may instead perform the flow line analysis and the shelf-front action detection of the customer. In the present modification example, the in-store monitoring device 1 receives, from the external device, a result of the flow line analysis and a result of the shelf-front action detection. Alternatively, the external device may generate flow line—acquisition number information and store the flow line—acquisition number information in the storage unit 16, and the in-store monitoring device 1 may acquire the flow line—acquisition number information stored by the external device in the storage unit 16.

According to a configuration of the present modification example, the in-store monitoring device 1 may not include the flow line analysis unit 12 and the shelf-front action detection unit 13. Thus, it is possible to reduce a computer resource required for processing of flow line analysis (S101 in FIG. 3) and shelf-front action detection (S102 in FIG. 3) of a customer.

Advantageous Effect of Present Example Embodiment

According to the configuration of the present example embodiment, flow line information of a customer and information on the number of items acquired by the customer are stored in association with each other. By using the stored information, it is possible to accurately measure which customer acquires how many items, with a simple configuration.

Therefore, it is possible to detect an action of a customer who is suspected to be fraudulent, such as that the customer leaves a store while possessing an unpaid item. Further, privacy of a customer can be properly protected, since a video being captured for the customer is not managed.

In addition, when an action suspected to be fraudulent is detected, it is possible to prompt a security guard or a shop clerk to address by notifying an anomaly. Therefore, a security guard or a shop clerk does not need to continuously monitor a video for finding a fraud. As a result, it is possible to reduce a burden on a security guard and a shop clerk, and prevent the security guard and the shop clerk from overlooking a fraud.

Example Embodiment 2

An in-store monitoring device according to the present example embodiment is described with reference to FIG. 5.

(Configuration of In-Store Monitoring Device 2)

Figure 5:
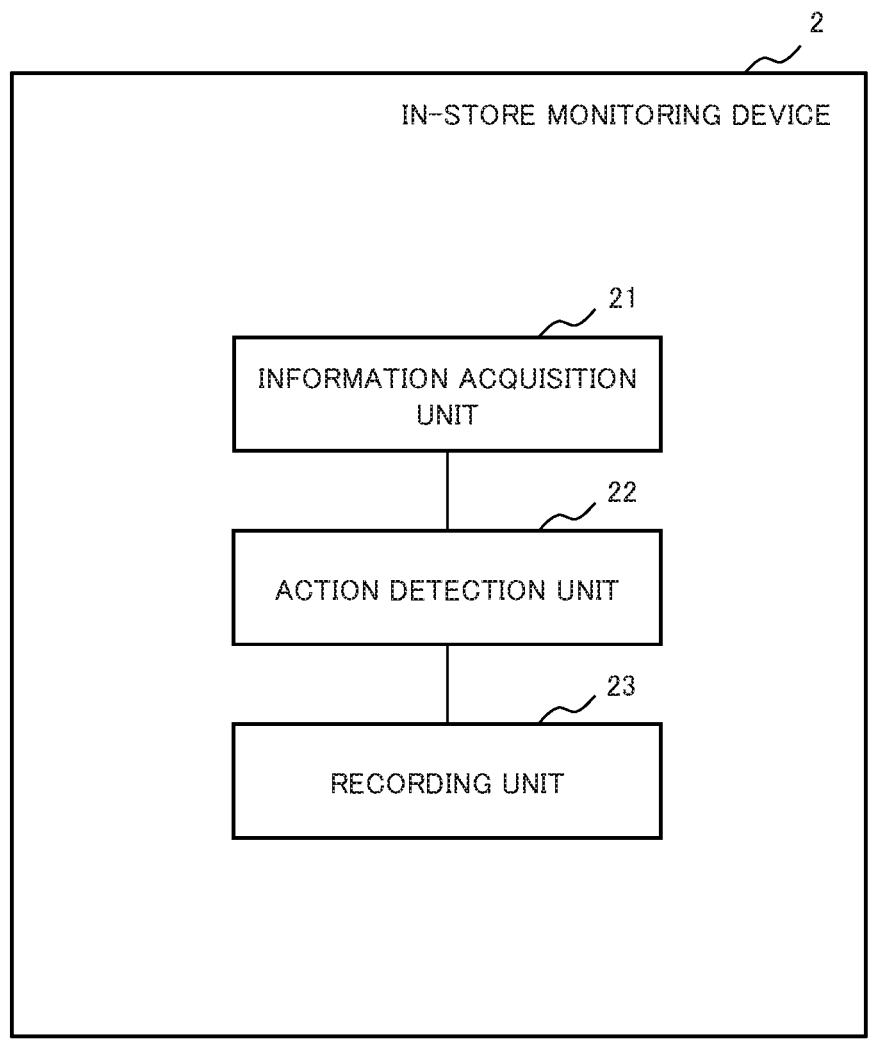
FIG. 5 is a block diagram illustrating a configuration of an in-store monitoring device according to an example embodiment 2.

FIG. 5 is a block diagram illustrating an in-store monitoring device 2 according to the present example embodiment. As illustrated in FIG. 5, the in-store monitoring device 2 includes an information acquisition unit 21, an action detection unit 22, and a recording unit 23. The in-store monitoring device 2 acquires data of a video captured by an external imaging device (for example, a camera), although it is not illustrated. Further, the in-store monitoring device 2 causes an external storage device (for example, a memory) to store flow line—acquisition number information. Alternatively, the in-store monitoring device 2 may include an imaging device and a storage device.

The information acquisition unit 21 acquires flow line information of a customer generated by analyzing the data of the video captured by the external imaging device. A flow line analysis technique for tracking a customer on a video is, for example, disclosed in PTL 2.

The action detection unit 22 detects, by using a shelf-front action detection technique (for example, PTL 3), that the customer acquires an item in a store.

The recording unit 23 stores, as the above-described flow line—acquisition number information in a storage means (unillustrated), flow line information of the customer and information on the number of items acquired by the customer in association with each other. Note that, the recording unit 23 according to the present example embodiment corresponds to a part of the flow line analysis unit 12 and a part of the shelf-front action detection unit 13 according to the example embodiment 1. The in-store monitoring device 2 according to one modification example may not perform flow line analysis and shelf-front action detection of the customer, and an external device (for example, a network server) may instead perform the flow line analysis and the shelf-front action detection of the customer. In the present modification example, the recording unit 23 acquires each result of the flow line analysis and the shelf-front action detection of the customer, being performed by the external device, and stores the acquired result in a storage means (unillustrated).

Advantageous Effect of Present Example Embodiment

According to the configuration of the present example embodiment, flow line information of a customer and information on the number of items acquired by the customer are stored in association with each other in a storage means. Therefore, it is possible to accurately measure which customer acquires how many items, by referring the information (flow line—acquisition number information) stored in the storage means. The information on the number of items measured in such a way can be used, for example, for preventing shoplifting. This is because it can be known that a customer is about to bring an unpaid item out of a store. Further, the flow line information of a customer does not include information related to privacy, unlike a video being captured for the customer. Therefore, privacy of the customer can be properly protected.

Example Embodiment 3

An in-store monitoring device according to the present example embodiment is described with reference to FIG. 6.

(Configuration of In-Store Monitoring Device 3)

Figure 6:
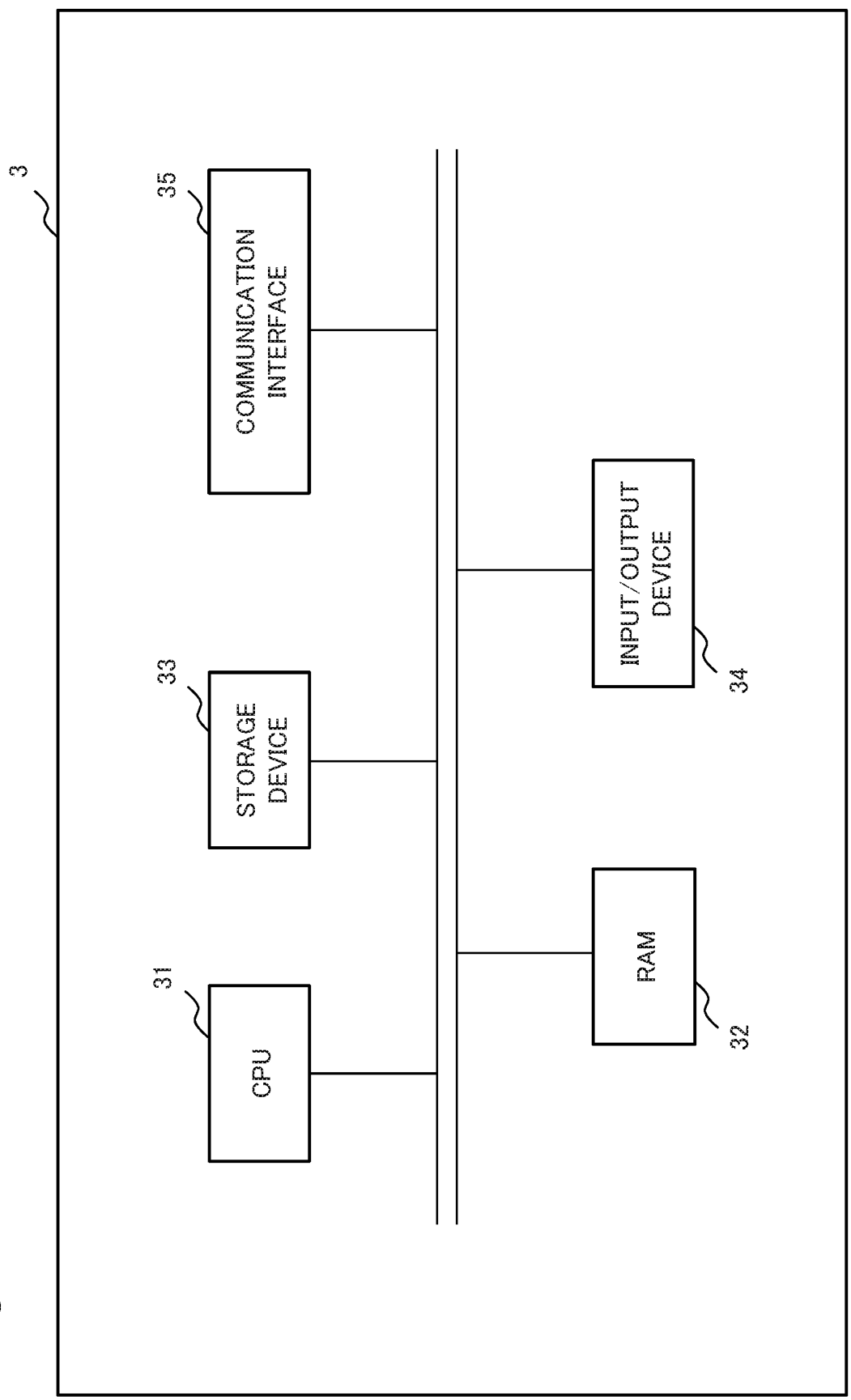
FIG. 6 is a diagram illustrating a hardware configuration of an in-store monitoring device according to an example embodiment 3.

FIG. 6 is a diagram illustrating a configuration of an in-store monitoring device 3 according to the present example embodiment. The in-store monitoring device 3 is achieved as hardware by a computer device. The in-store monitoring device 3 includes a central processing unit (CPU) 31, a random access memory (RAM) 32, a storage device 33, an input/output device 34, and a communication interface 35.

A function of the in-store monitoring device 3 is identical to the in-store monitoring device 1 according to the example embodiment 1 or the in-store monitoring device 2 according to the example embodiment 2. In other words, the in-store monitoring device 3 achieves an operation of a function block included in the in-store monitoring device 1 according to the example embodiment 1 or the in-store monitoring device 2 according to the example embodiment 2. The function of the in-store monitoring device 3 is achieved by the CPU 31 executing a program read into the RAM 32.

The storage device 33 includes the storage unit 16 according to the example embodiment 1. The storage device 33 stores flow line—acquisition number information.

The input/output device 34 includes the notification unit 15 according to the example embodiment 1. The input/output device 34 may include a user interface such as a display.

The communication interface 35 is used in order to acquire video data from an external imaging device.

Advantageous Effect of Present Example Embodiment

According to the configuration of the present example embodiment, the function of the in-store monitoring device described in the example embodiment 1 or 2 is achieved as hardware by using a computer resource such as a CPU. Therefore, it is possible to accurately measure which customer acquires how many items, while considering privacy of the customer.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims.

This application is based upon and claims the benefit of priority from Japanese patent application No. 2018-015408, filed on Jan. 31, 2018, the disclosure of which is incorporated herein in its entirety by reference.

REFERENCE SIGNS LIST 1, 2, 3 In-store monitoring device
12 Flow line analysis unit
13 Shelf-front action detection unit
14 Anomaly detection unit
15 Notification unit
16 Storage unit
21 Information acquisition unit
22 Action detection unit
23 Recording unit

The invention claimed is:

1. An information processing method, comprising:
acquiring, from a video, a plurality of time-series positions of a customer;
detecting a number of items acquired by the customer at each of the plurality of time-series positions;
storing, in a storage device, flow line information including the plurality of time-series positions and the number of items corresponding to each of the plurality of time-series positions;
identifying, based on a position of the customer, a portion of the flow line information stored in the storage device;
acquiring, from the storage device, the number of items corresponding to the portion of the flow line information;
when the customer is within a predetermined area, determining, from the flow line information stored in the storage device, a total number of items acquired by the customer; and
detecting, based on the determined total number of items, an anomaly related to an action of the customer,
wherein the anomaly is a discordance between the determined total number of items and a number of items paid for by the customer at a register.

2. The information processing method according to claim 1, further comprising:
when the customer goes out of the predetermined area, detecting, as the anomaly, that the determined total number of items is one or more.

3. The information processing method according to claim 1, further comprising:
when the customer crosses a predetermined line, detecting, as the anomaly, that the determined total number of items is one or more.

4. The information processing method according to claim 1, further comprising:
notifying that the anomaly is detected.

5. An information processing device, comprising:

at least one memory configured to store instructions; and at least one processor configured to execute the instructions to:
- acquire, from a video, a plurality of time-series positions of a customer;
- detect a number of items acquired by the customer at each of the plurality of time-series positions;
- store, in a storage device, flow line information including the plurality of time-series positions and the number of items corresponding to each of the plurality of time-series positions;
- identify, based on a position of the customer, a portion of the flow line information stored in the storage device;
- acquire, from the storage device, the number of items corresponding to the portion of the flow line information;
- when the customer is within a predetermined area, determine, from the flow line information stored in the storage device, a total number of items acquired by the customer; and
- detect, based on the determined total number of items, an anomaly related to an action of the customer,
- wherein the anomaly is a discordance between the determined total number of items and a number of items paid for by the customer at a register.

6. A non-transitory recording medium storing a program for causing a computer to execute:
- acquiring, from a video, a plurality of time-series positions of a customer;
- detecting a number of items acquired by the customer at each of the plurality of time-series positions;
- storing, in a storage device, flow line information including the plurality of time-series positions and the number of items corresponding to each of the plurality of time-series positions;
- identifying, based on a position of the customer, a portion of the flow line information stored in the storage device;
- acquiring, from the storage device, the number of items corresponding to the portion of the flow line information;
- when the customer is within a predetermined area, determining, from the flow line information stored in the storage device, a total number of items acquired by the customer; and
- detecting, based on the determined total number of items, an anomaly related to an action of the customer,
- wherein the anomaly is a discordance between the determined total number of items and a number of items paid for by the customer at a register.

7. The information processing method according to claim 1, wherein the predetermined area is an area in front of the register where the customer lines up to pay.

* * * * *